March 20, 1934.  W. L. CALDWELL  1,951,344
MANUFACTURE OF PRECAST BUILDING UNITS OF POROUS CONCRETE
Filed Sept. 14, 1931

Inventor:
Wallace L. Caldwell,
By Frank L. Belknap
Attorney.

Patented Mar. 20, 1934

1,951,344

UNITED STATES PATENT OFFICE 1,951,344

MANUFACTURE OF PRECAST BUILDING UNITS OF POROUS CONCRETE

Wallace L. Caldwell, Birmingham, Ala.

Application September 14, 1931, Serial No. 562,831

2 Claims. (Cl. 25—155)

This invention relates to a method of manufacture of porous concrete blocks, slabs, tiles and other precast building units. Porous concrete as understood in this invention is concrete derived from a mixture of hydraulic cement and water, either with or without aggregates, which is expanded, with the development of a porous or cellular structure, by the addition of substances capable of reacting in the concrete mixture with the evolution of gas prior to the setting of the concrete.

Porous concrete precast units have heretofore been made according to various methods. In one method used, the units are cast in open horizontal molds at atmospheric pressure, the expansion taking place in the direction of the smallest dimension of the unit. After completion of expansion the upper surface of the unit is screeded off to a smooth finish. This type of manufacture requires a large area of working space and an excessive amount of hard labor. Furthermore, the units so cast are of irregular porosity from top to bottom. Irregular porosity in a precast unit is objectionable because of the fact that where the cell structure is most dense the material has a comparatively high strength; whereas, where the cell structure is most porous, the strength is quite low. By using the method described, the bottom portion of a block is quite dense. In fact, the bottom inch is frequently almost solid and comparatively free from cells; whereas, in the same unit the top inch or two is frequently so porous as to have little or no strength. It can readily be seen that this is a most undesirable feature in a precast building unit. Conversely, regular structure from top to bottom gives regular and uniform strength throughout all portions of the unit. Hollow units and many other practical building units cannot be made by this method.

Many practical building units can be made and are made by expanding in open molds at atmospheric pressure. However, these units are a solid type of unit of considerable dimension, such as three and four inch solid partition blocks, wall blocks 8' x 8' x 12', roof slabs 6' x 2' x 3''—the latter of which are always cast flat. However, hollow units for partition walls are far more practical than are solid units, since they are of much lighter weight, are laid up more readily, and are competitive, so far as price is concerned, with gypsum and clay units. Solid units are not competitive in price. Hollow units with a thin wall have not been made successfully in open molds at atmospheric pressure. In an open mold it seems difficult, if not impossible, to get satisfactory expansion in a thin wall with the height necessary.

In order to give more uniform porosity, methods of turning over the mold prior to initial set of the concrete mixture have been suggested. However, this procedure is impractical and results in disturbance of the cell structure of the expanding mixture.

It has also been proposed to cast the units in an air tight mold, which method is open to the objection that expansion of the mix compresses the air above the surface of the expanding mixture until a balance is reached between the compressed air and generating gas forming in effect a cushion, preventing the top of the expanding mixture from reaching the top of the mold.

It has also been proposed to manufacture precast units of porous concrete in closed molds maintained under vacuum, but it is found that the irregular porosity is even more noticeable than in units cast in open molds. It has been observed that the top portion of units cast in vacuum is extremely porous with large cell spaces, whereas the bottom portion of the same units is comparatively dense. This method also has the disadvantage of requiring very expensive molds, and of requiring the maintenance of reduced pressure until the cement has set, it having been found that the units completely collapse in the event that the vacuum is removed prior to setting.

I have found, as a result of extensive manufacturing research, that the casting or molding of precast units of porous concrete in closed molds will accomplish certain entirely new and novel results in the manufacture of such units.

Figure 1:
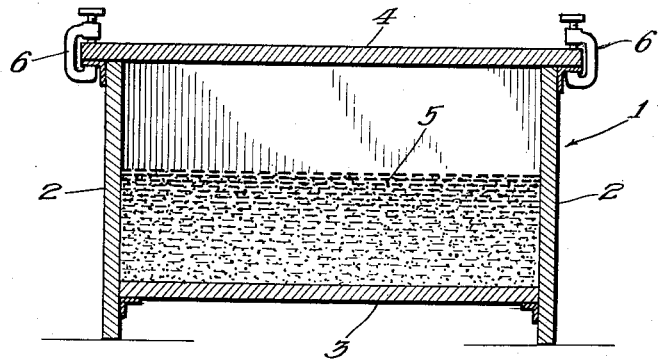
Fig. 1 is a vertical, sectional view of a mold suitable for carrying out my invention.
Figure 2:
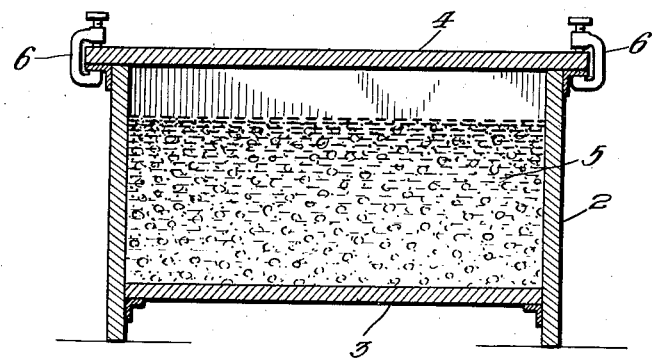
Fig. 2 is a view similar to that shown in Fig. 1 illustrating the mixture during the expanding period.
Figure 3:
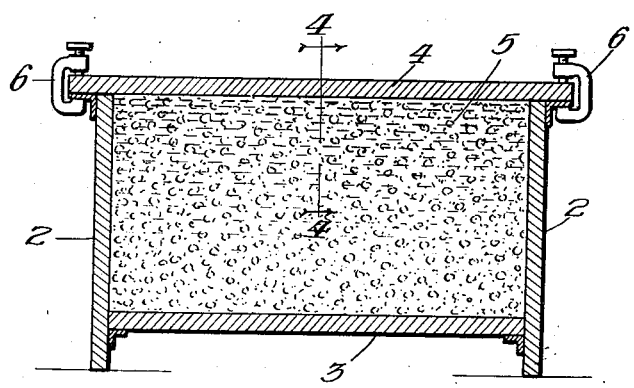
Fig. 3 is a similar view showing complete expansion of the mixture.
Figure 4:
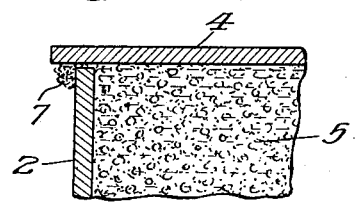
Fig. 4 is a fragmentary sectional view illustrating the fluid leakage from the mold when the mixture tends to expand to a volume greater than the volume of the mold.

Referring in detail to the drawing, 1 indicates a mold which may comprise sides 2, bottom 3 and a removable top or cover 4. After introducing a quantity of the molded mixture 5 into the mold 1, the cover 4 may be clamped over the open top of the mold by means of clamps or the like 6. However, although the mold 1 is sufficiently tight on all sides to permit the internal pressure generated within the mixture to exert its force against all sides of the mold as shown in Fig. 3, the juncture between the cover 4 and sides 2 may be such as to permit the escape of air being compressed above the expanding mixture, or any surplus gas or excess water rising to the surface of the expanding material, as shown best at 7 in Fig. 4.

Units so cast are of substantially uniform cell structure throughout and are of very uniform dimension, with all corners and edges sharp and true.

The use of molds closed on all sides also permits the casting of precast units with one of the longer dimensions in the vertical position. For instance, slabs of dimensions 12" x 36" x 1½" have heretofore been cast flat with the 1½" dimension in the vertical position. With open molds a vertical expansion of more than six or seven inches, with the lighter or medium weights of porous concrete was the maximum. With my method of using completely closed molds it is readily possible to cast such units with the 12" dimension vertical. It is possible to attain a vertical expansion of 12 inches or more with as thin a unit as ½". This method of molding permits the manufacture of many types of precast units which have before this been entirely impracticable with porous concrete.

Briefly described, one embodiment of the present invention consists of pouring into the molds, to a predetermined height, the wet concrete mixture, the upper side of the mold being open at time of pouring. The upper side of the mold is then closed with suitable forms. Expansion takes place under pressure generated by the gas evolving in the mixture. The molds remain closed until expansion is completed and the concrete has become partially or completely set, after which the precast block or slab is separated from the mold.

This invention is applicable to the manufacture of every sort of brick, block, tile, slab, or other precast unit which it is practicable to make of porous concrete.

It is not intended, therefore, that the invention shall be limited to any particular design or type of mold or form, since the method is applicable to a great variety of precast units, each of which will require forms or molds of suitable dimensions, and design. Such molds may be of many different materials, such as sheet metal, glass, wood, or fiber board.

Likewise, any sort of porous concrete mixture might be used. Therefore, the following descriptions of methods of use of this invention are intended to be illustrative only and are not to be considered as limiting the scope of the invention to these particular applications.

For the manufacture of partition slabs of dimensions of 12" x 24" x 4", a box mold with a capacity of from 6 to 20 slabs as desired, and with removable dividing partitions separating the individual slabs may be used. The mold is so designed as to permit the 12" dimension to be vertical. The mold is originally closed on the ends, sides, and bottom. The wet porous concrete mixture is poured into the box mold to a predetermined height sufficient to allow expansion of from 100 to 125%. The removable metal or wood partitions separating the slabs are immediately inserted. The top of the mold is then closed with a suitable wood or metal cover, substantially tight, but not gas or water tight. The expansion of the porous concrete mixture then proceeds in the closed mold.

The rate of expansion may be controlled to any desired rate by means of the amount of expanding agent added to the mixture and by several other well known means. For instance, it is practical to so control expansion that the molds will be entirely filled after about 30 minutes. The self-generated gas pressure in the mixture serves to force the wet expanding mixture into all parts of the mold so that all edges and sides are sharp and smooth. It is also found that the cell structure throughout the slab is quite uniform. After the porous concrete has taken its initial set, the top, ends, sides, and partitions may be removed. The slabs are then allowed to set and are cured by suitable methods.

A porous concrete mixture suitable for the above method of manufacture would have the following proportions of material.

Portland cement _____ 94 pounds
Sand _____ 300 pounds
Aluminum powder _____ 3 oz.
Water _____ 7 gals.
10% sodium hydroxide solution _____ 2 qts.

Another application of this invention is in the manufacture of floor or roof slabs or of building blocks in individual, separate molds. In this case the molds are made, in either wood or metal, of suitable dimensions, say 4" x 24" x 18". The molds are set up with the smaller dimension vertical and with closed bottoms, ends, and sides. Wet mix is then poured into the mold to a suitable height to allow desired expansion. The upper side of mold is then immediately covered with a suitably designed cover which is substantially tight but not gas or water tight. Similar molds may be piled, one on top of the other, each being filled with a suitable amount of wet mix immediately after being placed in position, and thereupon covered as described. It is possible to design the forms or molds so that the top of one serves as the bottom of the next succeeding mold. This application of the invention permits the expansion to take place in a closed mold under the self-generated pressure produced by the evolution of the gas. At the same time it permits great economy in area of working space required, over that needed when the usual procedure of casting in open molds with the upper surface screeded off at time of initial setting.

One of the preferred methods of curing precast units molded according to my invention is as follows:

After the precast unit is separated from the mold, it is preferably allowed to remain in the open air until after final set of the cement, the average period being from 8 to 72 hours after pouring. The precast units are then preferably placed in suitable pressure cylinders under high pressure steam which may have a pressure of from 50 to 125 pounds per square inch. The steam treatment period may vary from four to sixteen hours. The pressure used and duration of steam treatment will depend upon the character of porous concrete used and the type and size of precast unit being manufactured.

A typical example of manufacture would be of partition tile which would be cast as described, allowed to remain in air for 16 hours, then placed in a suitable pressure cylinder with a period of one hour for building up pressure from zero to 125 pounds per square inch, maintaining approximately 125 pounds pressure for 6½ hours and then allowing the pressure to drop to zero over a period of one-half hour.

The advantages of steam curing of precast units made according to the present invention are that in the few hours steam treatment it is possible to develop in the precast units a compressive strength equal to that developed by thirty days air curing, and the shrinkage to constant volume which normally requires 60 to 90 days, or even more, of air curing will all take place during the period of steam treatment.

Various materials are often admixed, in small proportions, with porous concrete mixtures for the purpose of producing greater plasticity of mix, for regulating setting time, and for other purposes. Among these materials are hydrated lime, pulverized slag, pulverized silica, clay, bentonite, diatomaceous earth, volcanic ash, calcium chloride and sodium chloride.

By the term "porous concrete" as used herein I intend to include any concrete having a cellular or porous structure composed substantially of any hydraulic cement and water, either with or without aggregates, and with or without various other minor admixtures of different substances.

By the term "cement" as used herein, I intend to cover any hydraulic cement capable of hardening or setting when mixed with water, such as Portland cement, natural cement, slag cement, or Puzzalon cement.

By the term "aggregate" as used herein, I refer to sand, gravel, cinders, slag, crushed stone, burned clay products, or any other material which may be used as an aggregate in concrete.

By the term "expanding agent" as used herein, I refer to any substance or substances capable of evolving a gas when mixed in a wet concrete mixture.

By the terms "closed mold" or "closed form" as used herein I intend to cover any design or type of mold or form suitable for the manufacture of precast building units of porous concrete, which molds or forms are so designed as to be open on one side, or having an opening on one side so as to permit the concrete mixture to be poured thereinto and which may be then closed with a removable top or side so that the mold is sufficiently tight on all sides to permit the internal pressure generated within the mixture to exert its force against all sides of the mold, but is not so tight as to prevent the escape, through the joints of the mold, of the air being compressed above the expanding mixture, or any surplus gas escaping from the mixture, or any excess water rising to the surface of the expanding mixture.

I claim as my invention:

1. The method of manufacture of precast building units of porous concrete which comprises causing expansion under atmospheric pressure of a mixture comprising cement, water and expanding agent to take place in a mold sufficiently tight to permit the mixture under the internal pressure generated therein to exert its force against all internal surfaces of the mold but not so tight as to prevent the escape of air, surplus gas or excess water, the quantity of mixture being sufficient to normally expand to a greater volume than the volume of the mold.

2. The method of manufacture of precast building units of porous concrete which comprises causing expansion under atmospheric pressure of a mixture comprising cement, water and expanding agent to take place in a mold sufficiently tight to permit the mixture under the internal pressure generated therein to exert its force against all internal surfaces of the mold but not so tight as to prevent the escape of air, surplus gas or excess water, the quantity of mixture being sufficient to normally expand to a greater volume than the volume of the mold, maintaining the mixture in said mold until expansion is completed, then separating the precast unit from the mold, subjecting it to open air curing until the unit has become set and then curing said unit in a closed zone maintained under high pressure steam.

WALLACE L. CALDWELL.